United States Patent Office 3,116,248
Patented Dec. 31, 1963

3,116,248
LUBRICATING OIL COMPOSITION
Duncan W. Frew, Martinez, Calif., assignor to Shell Oil Company, New York, N.Y., a corporation of Delaware
No Drawing. Filed Dec. 23, 1960, Ser. No. 77,815
11 Claims. (Cl. 252—32.5)

This invention relates to improved hydrocarbon lubricants and particularly to mineral lubricating oil compositions which possess good detergency, antiwear, as well as sludge, corrosion or rust inhibiting properties.

It is known that certain non-ash forming polymeric nitrogen-containing compounds in which the nitrogen-containing groups may be amino or amido groups such as vinyl pyridines or vinyl pyrrolidones, function as detergents when added in small amounts to lubricants such as mineral lubricating oils. However, copolymers of this type have been found to lack wear inhibiting properties and are corrosive and under severe conditions of use such as under extreme temperatures and pressure they have been found to be shear unstable resulting in sludging and other undesirable side effects.

In order to overcome these defects, the art discloses that the addition of basic polyvalent metal salts such as basic alkaline earth metal petroleum sulfonates or aromatic carboxylates such as alkyl salicylates, impart wear inhibiting properties to lubricants containing the above-mentioned non-ash forming detergents. However, it has been observed that the problem of corrosion remains and undesirable side effects such as sludging arise due to the apparent complexing tendencies between the nitrogen-containing polymer and the basic metal salts.

It has now been discovered that excellent ash-free detergent lubricants are provided having in addition wear and corrosion inhibiting properties as well as being resistant towards sludging tendencies, by dispersing in lubricating oil compositions such as mineral lubricating oils containing polymeric nitrogen-containing detergents, a small amount of an oil-soluble hydrocarbyl substituted guanidine salt of an alkyl acid phosphate or phosphonate or its thio derivative. The salt may be represented by the formula

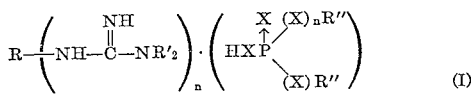

where R is a hydrocarbyl or hydrocarbyloxy radical, e.g., alkyl, aryl, aralkyl or alkaryl radical of from 6 to 18 carbon atoms or the corresponding oxy radicals, one or both R''s may be hydrogen or a $C_{1-4}$ alkyl radical, $n$ is an integer of from 1 to 4, X is oxygen and/or sulfur, preferably oxygen, and R'' is a hydrocarbyl radical, e.g., $C_{1-18}$ alkyl or chloroalkyl radical.

The detergent nitrogen-containing polymers useful in compositions of the present invention include copolymers of monomers having polymerized linkages and containing nitrogen-containing groups which may be amino or amido groups. They may be derived from polymerizable monomers containing primary, secondary or tertiary (the latter two are preferred) amino nitrogen, including heterocyclic amino or amido nitrogen-containing substances, having an ethylenically unsaturated polymerizable group. These detergent polymers may be obtained by polymerizing vinyl substituted heterocyclic nitrogen-containing substances such as vinyl pyridine, vinyl picoline and vinyl quinoline, vinyl pyrrolidone or vinyl arylamines such as paraaminostyrene, or polyamines prepared by reacting polymeric epoxy compounds with ammonia or primary or secondary amines, with polymerizable unsaturated alcohols, acids or esters such as acrylates and methacrylates of long chain fatty acids, and the like. The preferred polymeric amino or amido compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals such as are described in British Patent Specification 760,544 and U.S. Patents 2,839,512 and 2,889,282. The copolymers include: copolymer of stearyl methacrylate and 2-methyl-5-vinyl pyridine; copolymer of stearyl methacrylate, lauryl methacrylate and 2-methyl-5-vinyl pyridine; and those which contain additional $C_{1-4}$ alkyl methacrylates in the polymer, such as copolymers of stearyl methacrylates, lauryl methacrylate, methyl methacrylate and 2-methyl-5-vinyl pyridine; and similar copolymers in which the methyl methacrylate is replaced by butyl methacrylate and the 2-methyl-5-vinyl pyridine is replaced by 5-ethyl-2-vinyl pyridine; or copolymers of lauryl methacrylate and n-vinyl pyrrolidone or similar copolymers as described in Belgian Patent 550,442 and British Patent 808,664, and mixtures thereof. Acrylate-vinyl pyrrolidone copolymers are sold by Rohm and Haas under the designations Acryloid 315X or 917 or 966 and are copolymers of N-vinyl pyrrolidone and lauryl methacrylate of varying molecular weights. Other suitable polymeric amines are those available commercially such as those sold by E. I. du Pont de Nemours and Co. under the designations LOA 564 and 565, which are copolymers of lauryl methacrylate and diethylaminoethylmethacrylate (note U.S. Patent 2,737,496).

Particularly preferred detergent polymers are Acryloid 917 and 966 (copolymers of N-vinyl pyrrolidone and lauryl methacrylate in the molecular weight range of 400,000 to 500,000) or the copolymers of vinyl pyridine and mixtures of dissimilar methacrylate esters, the preparation of which is illustrated by the following examples.

Example I

A mixture of 25% of 2-methyl-5-vinyl pyridine and 75% stearyl methacrylate were heated in a 50–50 mixture of benzene and a light mineral oil (East Texas 100 SSU at 100° F. neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–210° C. The copolymer had a molecular weight of about 200,000 and a nitrogen content of 2.94%.

Example II

30% stearyl methacrylate, 51% lauryl methacrylate, 14% methyl methacrylate and 5.0% 2-methyl-5-vinyl pyridine were charged to a 300-gallon stainless steel autoclave. A 50–50 mixture of benzene and neutral petroleum oil was then added to the autoclave so as to furnish 1 part of the mixture per 3 parts of the total monomer. 0.25% of ditert.butyl peroxide was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer had a molecular weight of about 600,000 and a nitrogen content of 0.54%.

The wear and corrosion inhibitors for the above detergents and represented by Formula I include hydrocarbyl substituted guanidine or polyguanidine salts of organic acid phosphate, phosphonates or the thio derivatives of said acids.

Examples of the guanidine compounds include decyl guanidine, dodecylguanidine, phenylguanidine, benzylguadinine, decylbiguanidine, decyloxyguanidine, monooleoylamide of guanidine, etc., as well as hydrocarbyl guanidine carbonate or other suitable salts of inorganic acids.

The acid portion of the salt include hydrocarbyl acid phosphates, e.g., mono and dialkyl, mono and dicycloalkyl, diaralkyl, diaryl, alkyl aryl, aralkyl alkyl acid phosphates and their thio derivatives having from 8 to 30 carbon atoms in the molecule. Examples of suitable mono and di-acid and/or thio acid phosphates are mono and distearyl acid phosphate, mono and dioleyl acid phosphate, mono and dicyclohexyl acid phosphate, dicresyl acid phosphate, lauryl cresyl acid phosphate, dibenzyl acid phosphate, lauryl benzyl acid phosphate, dilauryl acid dithiophosphate, dilauryl thio acid phosphate; alkyl acid phosphonates such as monobutyl chloromethyl phosphonate, monolauryl chloromethyl phosphonate and the like. A preferred alkyl acid phosphate is "Lorol" acid phosphate, which is a mixture of phosphoric esters of "Lorol alcohol." The term "Lorol alcohol" is used in the trade to denote a mixture of primary normal aliphatic alcohols of 8 to 12 carbon atoms which are obtained by fractionation of the alcohols resulting from the reduction of cocoanut and/or palm oils. "Lorol" acid phosphate mixtures are readily obtainable on the market and for this reason are preferred to the purified esters of greater scarcity and higher price. One "Lorol" acid phosphate type is sold under the trade name "Ortholeum 162" and is understood to be mainly a mixture of the mono and diacid phosphates of "Lorol alcohol."

Examples of oil-soluble guanidine salts are: (1) decyl guanidine dilauryl phosphate, (2) decyl guanidine dioleyl phosphate, (3) decyl guanidine distearyl phosphate, (4) phenyl guanidine dilauryl phosphate, (5) benzyl guanidine dilauryl phosphate, (6) decyl biguanidine dilauryl phosphate, (7) decyl guanidine distearyl phosphate, (8) decyl guanidine dilauryl dithiophosphate, (9) dodecyl guanidine dicresyl phosphate, (10) dodecyl guanidine monobutyl chloromethyl phosphonate and mixtures thereof.

Additional improvement of oil compositions containing the above two additives of the present invention, namely the polymeric nitrogen-containing detergent and guanidine phosphate or phosphonate salts, particularly with respect to oxidation and storage stability is accomplished by addition of small amounts of alkylated bisphenols having the general formula:

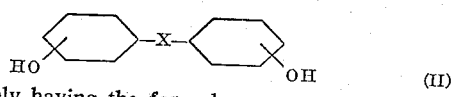

and preferably having the formula:

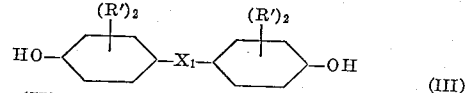

wherein in (II) X stands for $-S-$, $-S-S-$, Se, $-S-CH_2-$, $-CH_2-S-CH_2-$, $-CHR-$, $-CR_2-$, $-(CH_2)_n-$, $-NH-$, $-O-$, and wherein R stands for methyl or ethyl and $n$ stands for an integer from 1 to 3 and wherein in (III) $X_1$ is $CH_2$ or sulfur and R' is a tertiary alkyl radical. The most preferred alkylated bisphenols are represented by Formula III, those having a sulfur bridge or, and most especially, a methylene bridge and where R' is tertiary butyl radical.

The alkylated bisphenols may contain from 1 to 8 alkyl groups, but preferably they contain from 2 to 6 alkyl groups. Alkylated bisphenols having 4 alkyl groups are particularly preferred. Each of the alkyl groups may contain from 1 to 10 carbon atoms, preferably 2 to 6 carbon atoms and especially 4 carbon atoms. Furthermore, the alkyl groups contained by any particular bisphenol may be the same or different and may also be primary, secondary or tertiary alkyl groups. Bisphenols containing at least one tertiary alkyl group are particularly preferred.

The alkylated bisphenols may be prepared by any of the methods known in the art of bisphenol manufacture, for example, by selecting the appropriate alkylated phenols as starting materials and condensing them together by any of the established methods. For example, alkylated bisphenols may be prepared by the method described in U.S. Patent 2,944,086.

As examples of the alkylated bisphenols which may be used according to the invention there are mentioned bis(3-ethyl-4-hydroxyphenyl)disulfide,
bis(3-methyl-4-propyl-5-hydroxyphenyl)disulfide,
bis(2-isopropyl-3-butyl-5-hydroxyphenyl)selenide,
2,2'-diethyl-3-tertiary butyl-4,4'-dihydroxydiphenyl selenide,
bis-1,2-(2,6-ditertiary butyl-4-hydroxyphenyl)ehiaethane,
bis-1,2(2,5-diisopropyl-3-hydroxyphenyl)ehiaethane,
bis(3,5-ditertiary butyl-4-hydroxyphenyl)sulfide,
2,4-diisobutyl-3-hydroxybenzyl-2',4'-dipropyl-3-hydroxybenzyl sulfide,
bis-1,2(3-cotyl-5-tertiary butyl-4-hydroxyphenyl)ethane,
bis-1,1(2,6-diisopropyl-4-hydroxyphenyl)ethane,
1,2-bis(2,4-ditertiary pentyl-3-hydroxyphenyl)propane,
bis-2,2(4,5-ditertiary butyl-2-hydroxyphenyl)propane,
bis(2-tertiary butyl-5-isopentyl-4-hydroxyphenyl)amine,
bis(3,5-dibutyl-4-hydroxyphenyl)ether,
bis(2,6-dipropyl-4-hydroxyphenyl)ether.

Preferred compounds are the alkylated bisphenols having a sulfur or methylene bridge, the former include bis(2,5-dipentyl-4-hydroxyphenyl)sulfide,
bis(2,5-dihexyl-3-hydroxyphenyl)sulfide,
bis(2-methyl-5-tertiary butyl-4-hydroxyphenyl)sulfide,
bis(2-methyl-5-tertiary butyl-6-hydroxyphenyl)sulfide
and particularly
bis(3-tertiary butyl-5-methyl-2-hydroxyphenyl)sulfide, and examples of the latter, namely, alkylated bisphenols having a methylene bridge include bis(2,3-ditertiary butyl-4-hydroxyphenyl)methane,
bis(2,5-ditertiary butyl-4-hydroxyphenyl)methane,
bis(2,6-ditertiary butyl-4-hydroxyphenyl)methane,
bis(3,5-ditertiary butyl-4-hydroxyphenyl)methane,
bis(3,5-ditertiary octyl-4-hydroxyphenyl) methane,
bis(3-tertiary butyl-5-tertiary octyl-4-hydroxyphenyl) methane, and especially
bis(3,5-ditertiary butyl-4-hydroxyphenyl)methane.

Also the additive combination of the present invention appears to co-act with certain phosphorus compounds to give additional unexpected improvement in antiwear and antiscuffing. Thus, this desirable improvement can be imparted to lubricants of this invention by also incorporating a small amount (0.01–2%, preferably 0.1–1%) of a partial or full ester of an organic phosphorus compound. Phosphorus compounds of this type include alkyl, cycloalkyl, alkaryl, aralkyl, and aryl phosphites, phosphates, phosphonates, and their thio derivatives, such as $C_{3-18}$ alkyl phosphites, e.g., di and tributyl, octyl, lauryl, stearyl, cyclohexyl, benzyl, cresyl, phenyl phosphite or phosphates, as well as their thio derivatives; $P_2S_5$-terpene reaction product, $P_2S_5$-pine oil reaction product and metal salts thereof such as Na, K, Ca or Ba salts of $P_2S_5$-terpene reaction product; dibutyl methane-phosphonate, dibutyl trichloromethane phosphonate, dibutyl monochloromethane phosphonate, dibutyl chlorobenzene phosphonate, and the like. The esters of pentavalent phosphorus acids such as diphenyl, dicresyl, triphenyl, tricresyl, trilauryl and tristearyl ortho phosphates, $P_2S_5$-terpene reaction products and mixtures thereof are preferred.

Minor amounts of each class of additives are sufficient for a highly effective combination. The nitrogen containing copolymer and the guanidine salt may be used in an amount of about 0.1–10%, preferably about 0.2–5% by weight each of the lubricant, while about 0.05–2%, preferably about 0.1–1% of the methylene bisphenol or sulfide derivatives thereof is highly useful and about 0.1–2% of an organic phosphorus compound, ester or metal salt thereof.

The additive combinations of the present invention may be used to improve various hydrocarbon lubricating oils, whether of natural origin or synthetic, especially oils which are substantially parafinic and/or naphthenic; they may contain substantial proportions of hydrocarbons having aromatic character but the amounts and types of components should be such that the Dean and Davis (Chem. and Met. Eng., vol. 36, 1929, pp. 618–619) viscosity index of the base oil is at least 80, preferably at least 90 to 150.

The oil may be derived from a highly paraffinic crude, in which case distillation and/or dewaxing may be sufficient to provide a suitable base stock; a minimum of chemical or selective solvent treatment may be used if desired. Mixed base crudes and even highly aromatic crudes which contain paraffinic hydrocarbons also provide suitable oil base stocks by well known refining techniques. Usually these comprise the separation of distillate fractions of suitable boiling range followed by selective solvent extraction with solvents such as furfural, phenol and the like to provide raffinate fractions which are suitable for further refining by dewaxing and chemical treatment such as sulfuric acid treatment, etc. Thus, it may be a refined hydrocarbon oil obtained from a paraffinic, naphthenic, asphaltic or mixed base crude, and/or mixtures thereof, such as SAE 5W, 10W, 20W, 20, 30, 40, 50 mineral oils. The hydrocarbon oils may be blends of different mineral oil distillates and bright stock; they may have blended therewith minor but compatible proportions of fixed oils, such as castor oil, lard oil and the like and/or with synthetic lubricants, such as polymerized olefins, e.g., polyisobutylene.

The following compositions are representative of the invention.

Composition A: Percent
Decyl guanidine dilauryl phosphate _____ 1.4
Copolymer of N-vinyl pyrrolidone/lauryl methacrylate (M.W. 600,000) _____ 5.5
Bis(3,5 - ditert.butyl - 4 - hydroxyphenyl)methane _____ 0.5
Mineral lubricating oil (SAE 30) _____ Balance Composition B:
Dodecyl guanidine dilauryl phosphate _____ 1
Copolymer of N-vinyl pyrrolidone/lauryl methacrylate (M.W. 600,000) _____ 5.5
Bis(3,5 - ditert.butyl - 4 - hydroxyphenyl)methane _____ 0.5
Mineral lubricating oil (SAE 30) _____ Balance Composition C:
Phenyl guanidine dilauryl phosphate _____ 1.5
Copolymer of N-vinyl pyrrolidone/lauryl methacrylate _____ 5
Bis(3,5 - ditert.butyl - 4 - hydroxyphenyl)methane _____ 0.5
Mineral lubricating oil (10W–30) _____ Balance Composition D:
Decyl guanidine dioleyl phosphate _____ 1
Copolymer of Example II _____ 5.5
Mineral lubricating oil (SAE 20) _____ Balance Composition E:
Decyl guanidine dilauryl phosphate _____ 1
Copolymer of N-vinyl pyrrolidone/lauryl methacrylate ("Acryloid 917," Rohm and Haas) __ 5.5
Bis(3,5 - ditert.butyl - 4 - hydroxyphenyl)methane _____ 0.5
Tricresyl phosphate _____ 0.8
Dicresyl phosphate _____ 0.4
Mineral lubricating oil _____ Balance Composition F: Percent
Decyl guanidine dilauryl phosphate _____ 1
Copolymer of Example II _____ 5.5
Bis(3,5 - ditert.butyl - 4 - hydroxyphenyl)methane _____ 0.5
Tricresyl phosphate _____ 0.8
Dicresyl phosphate _____ 0.4
Mineral lubricating oil _____ Balance Composition G:
Decyl guanidine dilauryl phosphate _____ 2
Copolymer of Example II _____ 5
Oleylguanidine amide _____ 0.5
Bis(3,5 - ditert.butyl - 4 - hydroxyphenyl)methane _____ 0.5
Mineral lubricating oil _____ Balance Other representaive non-ash forming lubricating compositions of the present invention include mineral oil containing:

H—25% copolymer of Example I+0.5% of salt (4),
I—2% copolymer of Example II+0.25% of salt (7),
J—5% of copolymer of stearyl methacrylate/lauryl methacrylate/2-methyl-5-vinyl pyridine+.75% of salt (5),
K—4% of "Acryloid 917" copolymer+0.5% salt (8) +0.25% bis(3 - tert.butyl - 5 - methyl - 2 - hydroxyphenyl)sulfide,
L—5% "Acryloid 917" copolymer+0.75% salt (10) +bis(2 - tert.butyl - 5 - methyl - 2 - hydroxyphenyl)methane.

In order to demonstrate the utility and improved properties of lubricants of this invention, compositions A and B were tested under L-4 engine test conditions and at the end of the test period the engine was clean and in perfect condition. Also these compositions passed the General Motors MS rust test giving rating of 10 (perfect) and the exhaust gas rust test (EGRT) which comprises exposing oil-dipped steel panels to the exhaust vapors of a single cylinder 4-cycle Briggs and Stratton engine operating on a high sulfur fuel. The panels are exposed to the hot exhaust gases for 30 minutes, then cooled to a temperature of 0° F. for 16 hours and allowed to warm to room temperature. The cycle is then repeated before inspection. These compositions (A and B) gave rating of 10 (perfect). On the other hand composition X (mineral oil+2% dilauryl acid phosphate) and composition Y (mineral oil+1% decyl guanidine) failed in the L-4 test and in the MS and EGRT tests gave rating of 4–6.

Lubricating compositions of this invention are particularly applicable for high temperature, high speed use as in aviation engines, automotive engines and truck engines, as well as industrial equipment operating under the conditions described in this invention.

I claim as my invention:

1. An improved mineral oil composition comprising a major amount of mineral lubricating oil and from about 0.1% to about 10% of each of a copolymer of a polymerizable basic heterocyclic amine selected from the group consisting of vinyl pyrrolidine and vinyl pyridine and a polymerizable unsaturated material free of heterocyclic nitrogen-containing groups selected from long-chain alkyl acrylates and long-chain alkyl methacrylates having a molecular weight of from 100,000 to 850,000 and an oil-soluble $C_{8-16}$ alkyl guanidine salt of a compound selected from the group consisting of hydrocarbyl acid phosphonate and a hydrocarbyl acid phosphate the hydrocarbyl radical having from 1 to 18 carbon atoms and selected from the group consisting of alkyl and chloroalkyl radicals.

2. An improved mineral oil composition comprising a major amount of mineral lubricating oil and from about 0.1% to about 10% of each of a copolymer of a vinyl pyridine and a long-chain alkyl methacrylate having a molecular weight of from 200,000 to 600,000 and an oil-soluble $C_{8-16}$ alkyl guanidine $C_{1-18}$ dialkyl phosphate.

3. An improved mineral oil composition comprising a major amount of mineral lubricating oil and from about 0.1% to about 10% of each of a copolymer of a vinyl pyrrolidone and a long-chain alkyl methacrylate having a molecular weight of from 200,000 to 600,000 and an oil-soluble $C_{8-16}$ alkyl guanidine $C_{1-18}$ dialkyl phosphate.

4. An improved mineral oil composition comprising a major amount of mineral lubricating oil and from about 0.1% to about 10% of each of a copolymer of a vinyl pyridine and a long-chain alkyl methacrylate having a molecular weight of from 200,000 to 600,000 and an oil-soluble $C_{8-16}$ alkyl guanidine $C_{1-18}$ alkyl phosphonate.

5. An improved mineral oil composition comprising a major amount of mineral lubricating oil and from about 0.1% to about 10% of each of a copolymer of a vinyl pyrrolidone and a long-chain alkyl methacrylate having a molecular weight of from 200,000 to 600,000 and decyl guanidine $C_{1-18}$ alkyl phosphonate.

6. An improved mineral lubricating oil composition comprising a major amount of mineral lubricating oil and from about 0.1% to about 10% of each of copolymer of 2-methyl-5-vinyl pyridine and a mixture of lauryl and stearyl methacrylates having a molecular weight of from 200,000 to 600,000 and decyl guanidine dilauryl phosphate.

7. An improved mineral lubricating oil composition comprising a major amount of mineral lubricating oil and from about 0.1% to about 10% of each of a copolymer of vinyl pyrrolidone and lauryl methacrylate having a molecular weight of from 200,000 to 600,000 and decyl guanidine dilauryl phosphate.

8. The composition of claim 2 containing from about 0.1% to about 1% of a bisphenol having the formula

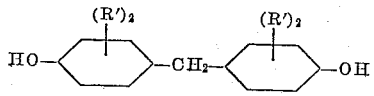

where R' is a tertiary alkyl radical.

9. The composition of claim 4 containing from about 0.1% to about 1% of a bisphenol having the formula

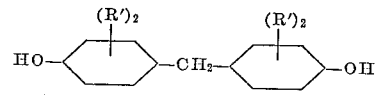

where R' is a tertiary alkyl radical.

10. An improved mineral lubricating oil composition comprising a major amount of mineral lubricating oil and 0.1% to 10% each of a copolymer of 2-methyl-5-vinyl pyridine and a mixture of lauryl and stearyl methacrylates having a molecular weight of from 200,000 to 600,000 and decyl guanidine dilauryl phosphate.

11. An improved mineral lubricating oil composition comprising a major amount of mineral lubricating oil and 0.1% to 10% each of a copolymer of vinyl pyrrolidone and lauryl methacrylate having a molecular weight of from 200,000 to 600,000 and decyl guanidine dilauryl phosphate.

References Cited in the file of this patent

UNITED STATES PATENTS

| | | |
|---|---|---|
| 2,285,853 | Downing et al. | June 9, 1942 |
| 2,370,756 | Sibley | Mar. 6, 1945 |
| 2,373,021 | Downing et al. | Apr. 3, 1945 |
| 2,644,792 | Hill | July 7, 1953 |
| 2,766,207 | McDermott | Oct. 9, 1956 |
| 2,779,739 | Spivack | Jan. 29, 1957 |
| 2,798,045 | Buck et al. | July 2, 1957 |
| 2,889,282 | Lorensen et al. | June 2, 1959 |
| 3,041,279 | Calhoun et al. | June 26, 1962 |

FOREIGN PATENTS

| | | |
|---|---|---|
| 822,620 | Great Britain | Oct. 28, 1959 |